United States Patent [19]

Kastelic et al.

[11] Patent Number: 5,242,966
[45] Date of Patent: Sep. 7, 1993

[54] STABILIZED POLYKETONE BLEND

[75] Inventors: John R. Kastelic; Charles E. Wilson, both of Katy, Tex.

[73] Assignee: Shell Oil Company, Houston, Tex.

[21] Appl. No.: 894,986

[22] Filed: Jun. 8, 1992

[51] Int. Cl.$^5$ ............................................. C08K 5/05
[52] U.S. Cl. ...................................... 524/379; 524/385
[58] Field of Search ............... 524/385, 386, 388, 389, 524/379; 525/56, 58

[56] References Cited

U.S. PATENT DOCUMENTS 4,812,522  3/1989  Handlin, Jr. ........................ 525/185
4,866,122  9/1989  Gerlowski et al. ................... 525/56
5,135,976  8/1992  Van Helden et al. ............... 524/114

Primary Examiner—Paul R. Michl
Assistant Examiner—Tae H. Yoon
Attorney, Agent, or Firm—James O. Okorafor

[57] ABSTRACT

A stabilized polymer composition comprising a linear alternating polymer of carbon monoxide and at least one ethylenically unsaturated hydrocarbon, and a melt stabilizing agent comprising of at least one compound having at least one or more hydroxyl group. A process for preparing the composition and articles of manufacture produced from the composition are also disclosed.

11 Claims, No Drawings

STABILIZED POLYKETONE BLEND

FIELD OF THE INVENTION

This invention generally relates to polyketone polymers. More particularly, this invention relates to a stabilized polyketone polymer composition comprising the polymer and a melt stabilizing agent.

BACKGROUND OF THE INVENTION

Polyketone polymers are generally known in the art. Of particular interest among polyketone polymers is the class of linear alternating polymers of carbon monoxide and at least one ethylenically unsaturated hydrocarbon. This particular class of polyketone polymers is disclosed and claimed in numerous patents assigned to Shell Oil Company.

It is known that these polyketone polymers are sometimes difficult to process. This processing difficulty may be manifested in terms of inadequate ultraviolet (UV), melt stability, and heat aging stability properties of the resulting polymer. It has been suggested that the deficient melt stability property is caused by the undesirable tendency of the polymer to crosslink, especially at melt processing temperatures. This causes the melt flow index of the resin to decrease with time at temperatures above melting (viscosity increases). "Plate-out" of crosslinked resins on screws, melt pipes and dies can also be observed. Various attempts to solve this problem have been made with some degree of success.

In spite of the progress that have been achieved towards melt stabilizing polyketones, further improvement of melt stability is desired. Therefore, there continues to be a need and/or search for materials that can effectively melt stabilize polyketones.

SUMMARY OF THE INVENTION

In accordance with this invention, it is now provided a melt stabilized polyketone blend having good mechanical properties, comprising a major portion of a linear alternating polymer of carbon monoxide and at least one ethylenically unsaturated hydrocarbon, and a non-alkaline hydroxyl group containing compound in an amount effective as a melt stabilizer.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), and a non-alkaline hydroxyl group containing compound sometimes referred to as an organic base. In general, the practice of this invention involves suitably admixing suitable quantities of the useful materials to form a stabilized polyketone polymer composition.

The resulting stabilized polyketone polymer composition has utility as a thermoplastic material for example in the manufacturing and coating of articles. These articles can be shaped articles such as containers for food and drink, fibers, and parts for the automotive industry, such as pipes and tubings, gears, and valve covers. These articles are produced by conventional methods exemplified by injection molding, and thermoforming.

The polyketone polymers of this invention are well known in the art. Their method of preparation, properties, etc. are disclosed in numerous patents, exemplified by U.S. Pat. No. 4,843,144 (van Broekhoven et al) which is herein incorporated by reference.

The melt stabilizers of this invention can generally be referred to as non-alkaline hydroxyl (OH) group(s) containing compounds. By this is meant that such a compound has at least one hydroxyl group. These compounds are exemplified by alcohols such as decyl alcohol, 2-ethyl-1-hexanol; glycols, such as glycerol monostearate; and polymers such as ethylene-vinyl alcohol polymers, e.g. polyvinyl alcohol. The most desirable non-alkaline hydroxyl group containing compounds as a general characteristics, have a high melting point and are chemically stable at high processing temperatures.

The hydroxyl containing compound, to be effective as a melt stabilizer, is generally present in an amount of from 0.01–10%, and preferably from about 0.5–2%. Qualitatively speaking though, the hydroxyl compound is required in an amount sufficient to effectively function as a melt stabilizer.

Other Additives

The stabilized polymer composition of the invention may also include other additives such as antioxidants, dyes, other fillers or reinforcing agents, fire resistant materials, mold release agents, colorants and other materials designed to improve the processability of the polymers of the properties of the resulting compound. Such additives are added prior to, together with, or subsequent to the blending of the polyketone, glass fibers, mineral fillers, and a hydroxyl group(s) containing compound.

Melt stabilization effects can be indicated by many types of observations. Among the most common indicators is the reduction of undesirable resin degradation during melt processing by the addition of the stabilizing additive. A stabilization effect is indicated if any combination of the following are observed during processing upon addition of the additive: reduced discoloration during processing, lowered amount of bubbles and off gassing, reduction in the amount of gels formed, reduction in the buildup of die and screw deposits within processing equipment, reduced amount of varnish buildup and sloughed back flecks, better retention of original melt viscosity and melt strength, improved surface gloss in formed parts, regrind performance closer to that of virgin resin, and improved ability to resist decomposition at long barrel residence times.

A very stable polymer will be essentially free from any of the negative effects listed above. Resins with good stability leave little room for improvement so the apparent effects may go unnoticed. Laboratory analytical methods can be utilized to detect degradation effects in very stable resins. These methods can thus also detect the comparatively subtle influence of process stabilizers in such stable resins. Temperatures can be raised above that normally recommended during processing.

Many analytical tests can be used to characterize the degree of melt degradation which takes place in a melt processing operation and the relative effect that additives may have on melt stability. Certain analyzable and quantifiable resin properties can be determined before and after processing. The degree of degradation experienced is indicated by the magnitude of change in the measured property or characteristic before and after processing. Alternatively, the thermal exposure of processing can be simulated in the analytical test to avoid the need to perform the actual melt processing step.

Values before and after thermal simulation of melt processing are also revealing. Examples of measurable properties and the analytical methods which can characterize melt degradation are:

Molecular weight as determined by:
  Gel Permeation Chromatography
  Solution Viscosity
  End Group Analysis
Melt viscosity as determined by:
  Melt Flow Index Test
  Rotating Plate Viscometer (parallel plate or cone and plate shear viscometer)
  Screw Torque Measurement in a lab extruder
Rate of change of melt viscosity as determined by any of the previously disclosed melt viscosity tests.
Gel Count, Black Speck Count or Bubble Count as measured by:
  Visual inspection
  Optical microscopy or Polarizing Optical Microscopy
Resin Filterability as measured by screen pack pressure buildup
Discoloration of the resin as measured by:
  Yellowness Index Test
  Reflective Spectrophotometer
  UV-Visible Transmission Spectrophotometer
Level of crystallinity (for semi-crystalline resins) as indicated by:
  Melting Endotherm and Crystallization Exotherm magnitude in Differential Scanning Calorimeter (DSC)
  X-ray crystal scattering intensity
  Density Measurement.

An increase in the melting point can in some instances be indicative of degradation. However, this can arise from other effects not related to stability, such as quenching/annealing effects and cooling history.

Changes in mechanical properties can also be used as a measure of melt stability. Reductions in tensile strength, elongation to break and toughness which occur upon processing are indicative of melt degradation. This is particularly true if such reductions are accompanied by any combination of the processing observations which are indicative of degradation or the analyzable changes disclosed herein.

The most desired result is to have no change in any of the above properties with either melt processing or simulation thereof. In relatively stable resins where little change occurs in normally brief times at melt process conditions, stabilizing effects can be detected by imposing length residence times in the melt with and without melt stabilizing additives. Alternatively, or additionally, the melt processing condition can be raised to higher temperatures to impose added thermal oxidative stress. Then experiments with and without the additive can be run and effects detected even in comparatively very stable resins.

For polyketone polymers, the melt viscosity typically increases with residence time at temperatures above melting. This can be monitored by melt rheometry and used to indicate the degree of melt stability of the resin. The more melt stable the resin the less the viscosity rises during a given residence time above melting. This can be measured at discrete time periods or, for more accuracy, the slope of the viscosity time curve can be determined in a continuous experiment.

The method of producing the stabilized polymer composition of the invention is not material so long as a relatively uniform distribution of glass fibers and/or mineral filler, and the hydroxyl group(s) containing compound(s) throughout the polyketone is obtained. The hydroxyl group(s) containing compound may exist as a discrete phase dispersed in the polyketone matrix or it may be soluble in the matrix. The method of producing the compounds is that which is conventional for filled polymeric composition. In one modification, the hydroxyl group(s) containing compound(s), glass fibers, mineral filler and polyketone are mixed and passed through an extruder operating at high RPM to produce the stabilized composition as an extrudate. In an alternate modification, the components are blended in a mixing device which exhibits high shear.

While not wishing to be bound by any particular theory, it is believed that the advantageous results of the invention are obtained because hydroxyl group(s) containing compound(s) has ion exchange and acid scavenging properties that allow it to neutralize the effect of ionic, aldehyde, or acidic species that accelerate a viscosity increase in the polyketone polymer in the melt state. Since few polymers exhibit such a tendency towards viscosity increase, the use of a hydroxyl group containing compound as a melt stabilizer for the polyketone polymer is particularly advantageous, providing melt stabilized compositions that are more readily processable into fabricated objects which exhibit useful mechanical properties.

The following examples and table further illustrate the various aspects of the invention.

EXAMPLE 1

Preparation of Polymer

A linear alternating terpolymer of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 224° C. and an LVN, measured in m-cresol at 60° C. of 1.7 dl/g.

EXAMPLE 2

Preparation of Melt Stabilized Blends

Polymer pellets were weighed out and placed in a 5 gallon plastic pail. The hydroxyl group containing additives were weighed out in tripours and then poured onto the pellets in the pail. The pail was sealed, placed in a tumbler, and tumbled for 10 minutes. The mixed material was fed directly into the extruder hopper. Strand produced was cooled and pelletized by normal methods. Disks for rheology testing were molded from this stabilized blend on an injection molding machine. Some rheology tests were performed. The results of these tests are shown in Table 1.

TABLE 1

|  | (later run) | Control (CEW 0100) | 1% Decyl Alc. (CEW 020) | 1% 2-Ethyl-1-Hexanol | Desired Value |
| --- | --- | --- | --- | --- | --- |
| Viscosity @ 0 min. | 736 | 617 | 617 | 617 | Any consistency value for entire set |
| Viscosity @ 10 min. | 3490 | 2928 | 2493 | 2304 | Want this as close to |

TABLE 1-continued

| | (later run) | Control (CEW 0100) | 1% Decyl Alc. (CEW 020) | 1% 2-Ethyl-1-Hexanol | Desired Value |
|---|---|---|---|---|---|
| Viscosity @ 30 min. | 11980 | 9722 | 8499 | 7129 | above t = 0 viscosity Want this as close to above t = 0 viscosity |
| Vis Normalized Slope | 415 | 405 | 355 | 287 | Want as low as possible, "zero" is ideal. |
| 240° C., Melt Flow Index Rise Rate | −0.024 | −0.023 | −0.022 | −0.019 | Want the least change in MFI as possible |

The amount by which the melt viscosity increases for a given residence time can be lowered by the addition of certain additives known as melt stabilizers. As shown by the results in Table 1, organic molecules and macromolecules which contain the OH pendant group or groups serve as mild stabilizers in aliphatic polyketones (PK). In particular Decyl Alcohol and 2-ethyl-1-hexanol can be added in small quantity, around 1% to polyketone and the rate of rise of melt viscosity is decreased. This is shown in Table 1 for polyketone resin with and without these additives. The stabilizing effect of alcohols is apparent in the melt viscosity measured at 10 and at 30 minutes residence time. With the alcohols present, a lower increase in melt viscosity is achieved. While the viscosities are the same at the beginning of the residence period, they increase less for the two formulations containing alcohols.

Also in this table the normalized slopes of the viscosity time curves are reported. The slopes are lower with the alcohol present. The melt flow index can also be observed with these resin systems. The rise rate of the melt flow index curve has been used here as the measure of stability. This is the slope of the melt flow index vs. residence time curve, which in this case is negative indicating that the melt flow index is decreasing with residence time above melting. The slope is less severe in the formulations containing alcohols than it is for the base resin. This again indicates the stabilizing effect of alcohols.

While this invention has been described in detail for the purpose of illustration, it is not to be construed as limited thereby but is intended to cover all changes and modifications within the spirit and scope thereof.

That which is claimed is:

1. A melt stabilized polymer composition comprising:
   (a) a linear alternating polymer of carbon monoxide and at least one ethylenically unsaturated hydrocarbon; and
   (b) decyl alcohol in an amount effective to function as a melt stabilizer.

2. A melt stabilized composition as in claim 1 wherein said linear alternating polymer is represented by the repeating formula

wherein G is a moiety of ethylenically unsaturated hydrocarbon of at least 3 carbon atoms polymerized through the ethylenic unsaturation and the ratio of y:x is no more than about 0.5.

3. A melt stabilized composition as in claim 1 wherein y is 0.

4. A melt composition as in claim 1 wherein G is a moiety of propylene and the ratio of y:x is from about 0.01 to about 0.1.

5. A melt stabilized composition as in claim 1 wherein said decyl alcohol is present in an amount of from about 0.01-10 wt %.

6. An article of manufacture made from the melt stabilized polymer blend of claim 1.

7. A melt stabilized polymer composition comprising:
   (a) a linear alternating polymer of carbon monoxide and at least one ethylenically unsaturated hydrocarbon; and
   (b) 2-ethyl-1-hexanol in an amount effective to function as a melt stabilizer.

8. A melt stabilized composition as in claim 7 wherein said linear alternating polymer is represented by the repeating formula

wherein G is a moiety of ethylenically unsaturated hydrocarbon of at least 3 carbon atoms polymerized through the ethylenic unsaturation and the ratio of y:x is no more than bout 0.5.

9. A melt stabilized composition as in claim 7 wherein y is 0.

10. A melt composition as in claim 7 wherein G is a moiety of propylene and the ratio of y:x is from about 0.01 to about 0.1.

11. A melt stabilized composition as in claim 7 wherein said decyl alcohol is present in an amount of from about 0.01-10 wt %.

* * * * *